(12) United States Patent
Chen et al.

(10) Patent No.: US 8,413,235 B1
(45) Date of Patent: Apr. 2, 2013

(54) MALWARE DETECTION USING FILE HERITAGE DATA

(75) Inventors: Joseph Huaning Chen, Los Angeles, CA (US); Christopher James Peterson, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 294 days.

(21) Appl. No.: 12/879,831

(22) Filed: Sep. 10, 2010

(51) Int. Cl.
*G06F 11/00* (2006.01)
*G06F 11/30* (2006.01)

(52) U.S. Cl. .............. 726/22; 726/24; 726/25; 713/188

(58) Field of Classification Search .............. 726/22, 726/24, 25; 713/188
See application file for complete search history.

(56) References Cited

U.S. PATENT DOCUMENTS

| | | | |
|---|---|---|---|
| 7,472,420 B1 * | 12/2008 | Pavlyushchik | 726/24 |
| 7,559,086 B2 * | 7/2009 | Sobko et al. | 726/24 |
| 8,104,090 B1 * | 1/2012 | Pavlyushchik | 726/24 |
| 2010/0192222 A1 * | 7/2010 | Stokes et al. | 726/22 |
| 2011/0083180 A1 * | 4/2011 | Mashevsky et al. | 726/23 |

* cited by examiner

*Primary Examiner* — Mohammad W Reza
(74) *Attorney, Agent, or Firm* — Fenwick & West LLP

(57) ABSTRACT

A security module on a client monitors file creations at the client and reports heritage data describing the monitored file creations to a security server. A file categorization module at the security server receives file heritage data reports from a plurality of clients. The heritage data reports identify parent files that created executable child files at the clients. The file categorization module filters the heritage data to identify and prioritize parent files that are not categorized. The file categorization module analyzes the uncategorized files in priority order to categorize the files as "expected executable file creators" or "executable file creators of interest." The file categorization module reports the file categorization data to the security modules of the clients. The security modules use the file categorization data to identify malware at the clients.

19 Claims, 5 Drawing Sheets

MALWARE DETECTION USING FILE HERITAGE DATA

BACKGROUND OF THE INVENTION

1. Field of the Invention

This invention pertains in general to computer security and in particular to the detection of malicious software.

2. Description of the Related Art

There is a wide variety of malicious software (malware) that can attack modern computers. Malware threats include computer viruses, worms, Trojan horse programs, spyware, adware and crimeware. Modern malware is often designed to provide financial gain to the attacker. For example, malware can surreptitiously capture important information such as logins, passwords, bank account identifiers, and credit card numbers. Similarly, malware can provide hidden interfaces that allow the attacker to access and control the compromised computer.

Software applications that are downloaded and installed on a client can either be vulnerable to malware attacks or contain malware. For example, many viruses attach themselves to legitimate executable files installed on a client. If a client launches an executable file with virus attached, the virus' code may be executed simultaneously. The virus may gain control of the client computer and attempt to infect other files. In another example, malicious code at a web site can exploit a vulnerability of a legitimate file at a client, and cause the legitimate file to perform malicious actions.

Security software can detect malware by scanning files for specific strings of bytes (i.e., "string signatures") characteristic of malware. However, because of the large number of legitimate and malicious software applications present in modern computing environments, it can be difficult for security software to use string signatures to accurately identify malware, especially previously unknown malware. There is thus an ongoing need for ways to accurately detect malware.

BRIEF SUMMARY

The above and other needs are met by methods, computer-readable storage media, and systems of using file heritage data to detect malicious software (malware).

One aspect provides a computer-implemented method of using heritage data to detect malware. Embodiments of the method comprises receiving heritage data reports from a plurality of clients, where the heritage data reports contain heritage data describing parent files detected at the clients and child files created by the parent files at the clients. The method analyzes the heritage data to categorize a parent file described by the heritage data as an executable file creator of interest, and reports the categorization of the parent file as an executable file creator of interest to the plurality of clients. The clients are adapted to use the categorization of the parent file to detect malware at the clients.

Another aspect provides a non-transitory computer-readable storage medium storing executable computer program instructions of using heritage data to detect malware. The computer-readable storage medium stores computer program instructions for receiving heritage data reports from a plurality of clients, where the heritage data reports contain heritage data describing parent files detected at the clients and child files created by the parent files at the clients. The computer-readable storage medium further comprises computer program instructions for analyzing the heritage data to categorize a parent file described by the heritage data as an executable file creator of interest, and instructions for reporting the categorization of the parent file as an executable file creator of interest to the plurality of clients. The clients are adapted to use the categorization of the parent file to detect malware at the clients.

Still another aspect provides a computer system of using heritage data to detect malware. The system comprises a non-transitory computer-readable storage medium storing executable computer program modules including a filtering module, a data analysis module and a server interaction module. The server interaction module is for receiving heritage data reports from a plurality of clients, where the heritage data reports contain heritage data describing parent files detected at the clients and child files created by the parent files at the clients. The filtering module is for filtering heritage data to identify parent files for categorization analysis. The data analysis module is for analyzing the heritage data to categorize a parent file described by the heritage data as an executable file creator of interest. The server interaction module is further for reporting the categorization of the parent file as an executable file creator of interest to the plurality of clients. The clients are adapted to use the categorization of the parent file to detect malware at the clients.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
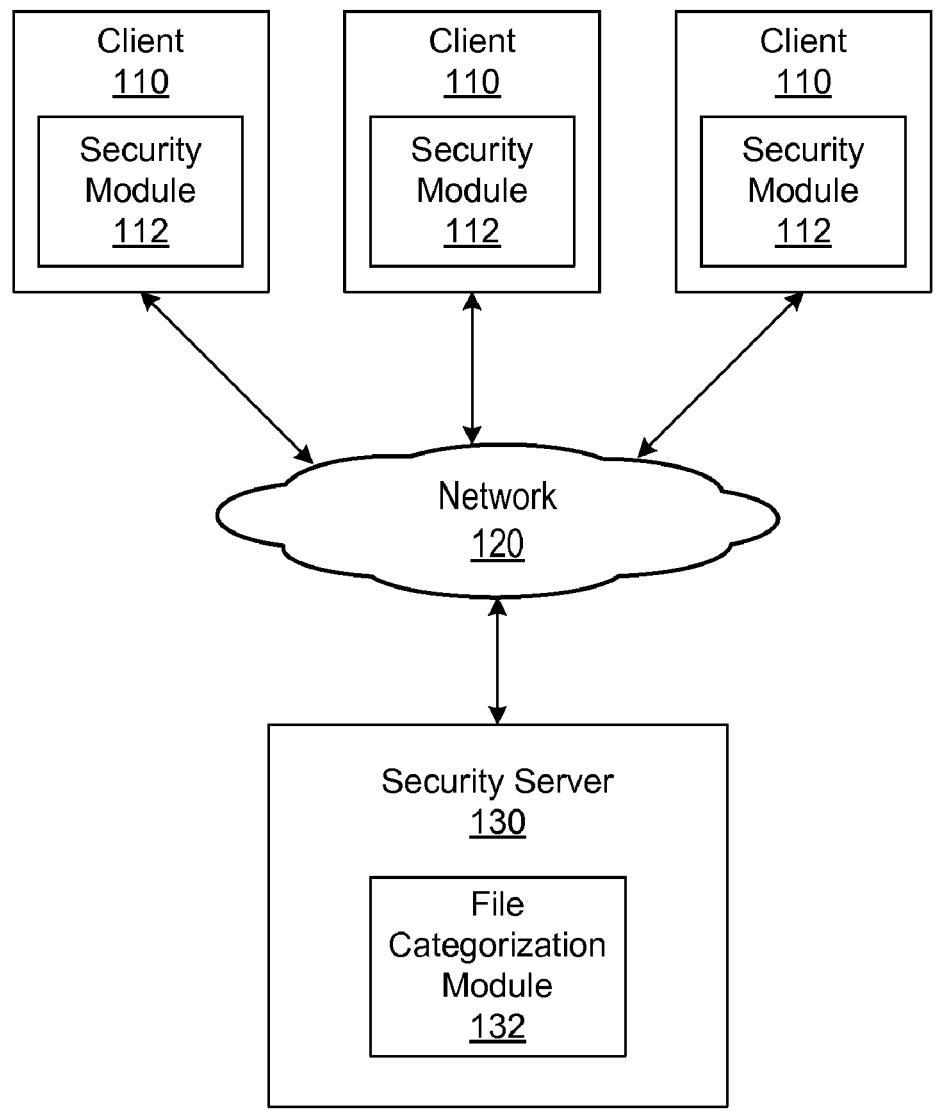
FIG. 1 is a high-level block diagram of a computing environment for using file heritage data to detect malicious software according to one embodiment.

FIG. 1 is a high-level block diagram of a computing environment 100 for using file heritage data to detect malicious software (malware) according to one embodiment. FIG. 1 illustrates a security server 130 and three clients 110 connected by a network 120. The illustrated environment 100 represents a typical computing environment where multiple clients 110 interact with the security server 130 to identify and remediate malware at the clients 110. Only three clients 110 are shown in FIG. 1 in order to simplify and clarify the description. Embodiments of the computing environment 100 can have many clients 110 and security servers 130 connected to the network 120.

The client 110 is used by a user to interact with the security server 130 and/or other entities on the network 120. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways that encounter software applications or other entities that might constitute malware or other threats. For example, a client 110 can be a network gateway located between an enterprise network and the Internet.

The client 110 executes a security module 112 that monitors file creations at the client 110 and reports heritage data describing the monitored file creations to the security server 130. The heritage data associated with a file creation describes the file that created a new file and the created file, and may contain additional information such as identifiers of any files that are created by the created file. Herein, a file that creates another file is referred to as the "parent file" and the file created by the parent file is referred to as the "child file."

The security module 112 can monitor for creations of only certain types of files. In one embodiment, the security module 112 specifically monitors for creations of executable files, such as files in the portable executable (PE) format having the ".EXE" file extension. Other embodiments monitor for other types of executable files, for altogether different file types, or for any type of file creation.

In addition, the security module 112 can detect malware using file categorization data received from the security server 130. These data describe expected file creation behaviors of certain files. The file categorization data categorizes some files as "executable file creators of interest." Files within this category are known to not typically create executable files and thus are "of interest" if they create an executable file. If the security module 112 detects this type of file creating an executable file, then this detection signifies that the file creator (parent) is behaving anomalously. The anomalous behavior is evidence that the file creator was subverted or otherwise compromised by malware and behaving maliciously. The security module 112 uses this evidence, in combination with other characteristics such as the files' reputations, to detect and remediate malware at the client 110.

The security server 130 interacts with the clients 110 via the network 120. A file categorization module 132 at the security server 130 receives the file heritage data from the clients 110 and uses the heritage data to create the file categorization data it reports to the clients. By aggregating heritage data from many clients 110, the file categorization module 132 observes typical behaviors of files and categorizes the files based on their behaviors. For example, the security server 130 can categorize a previously unknown file as an "expected executable file creator" or as an "executable file creator of interest" based on factors such as the number of clients 110 on which the file was detected, the number of clients 110 on which the file created a child executable file, whether the child executable file was a known malicious file, reputation scores of the parent and/or child files, etc. Thus, the security server 130 uses the file heritage data to generate the file categorization data and thereby improves the malware-detection capabilities of the clients 110.

The network 120 enables communications among the clients 110 and the security server 130 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
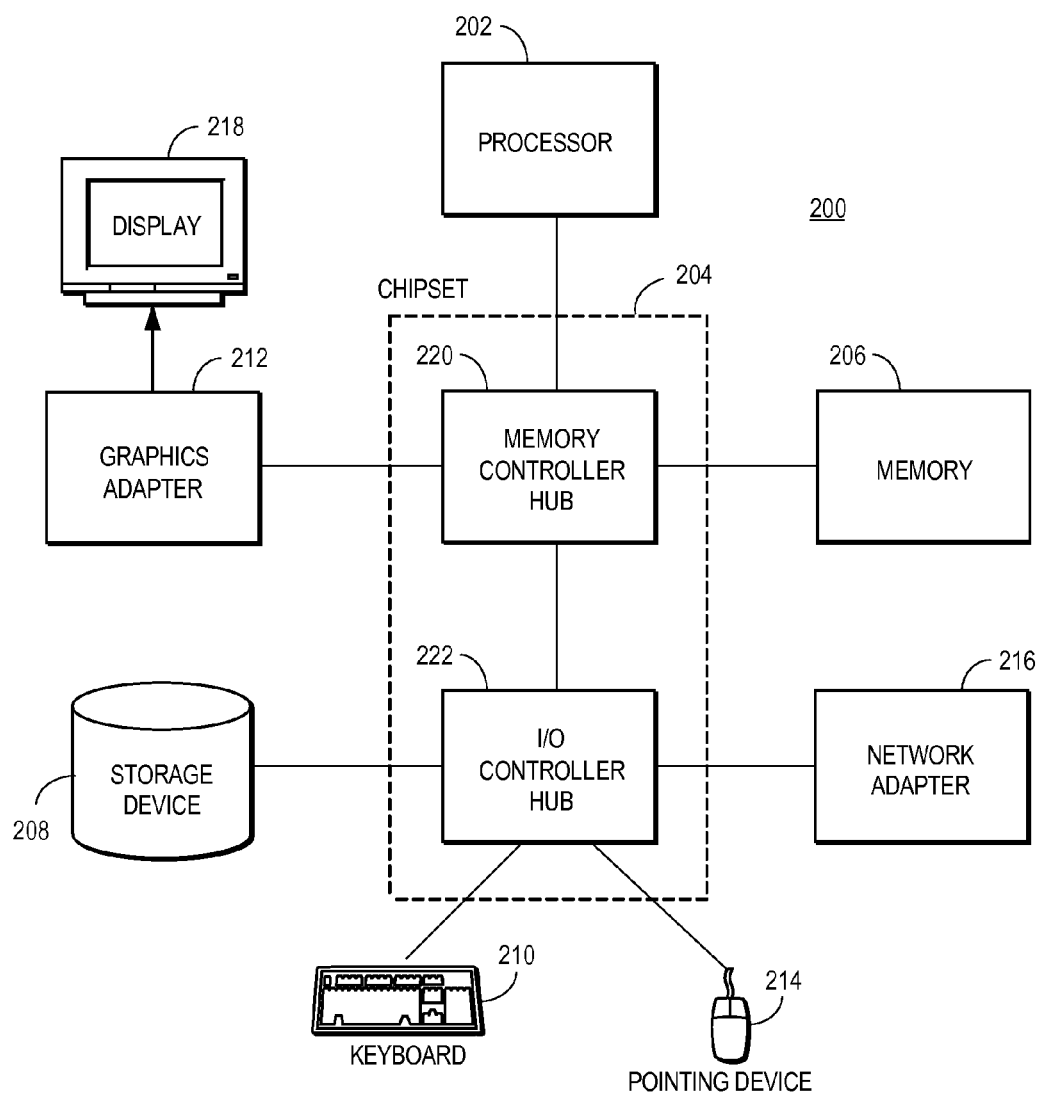
FIG. 2 is a high-level block diagram illustrating a typical computer for use as a security server or a client.

FIG. 2 is a high-level block diagram of a computer 200 for acting as a client 110 and/or as a security server 130. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device and stores files. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a security server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
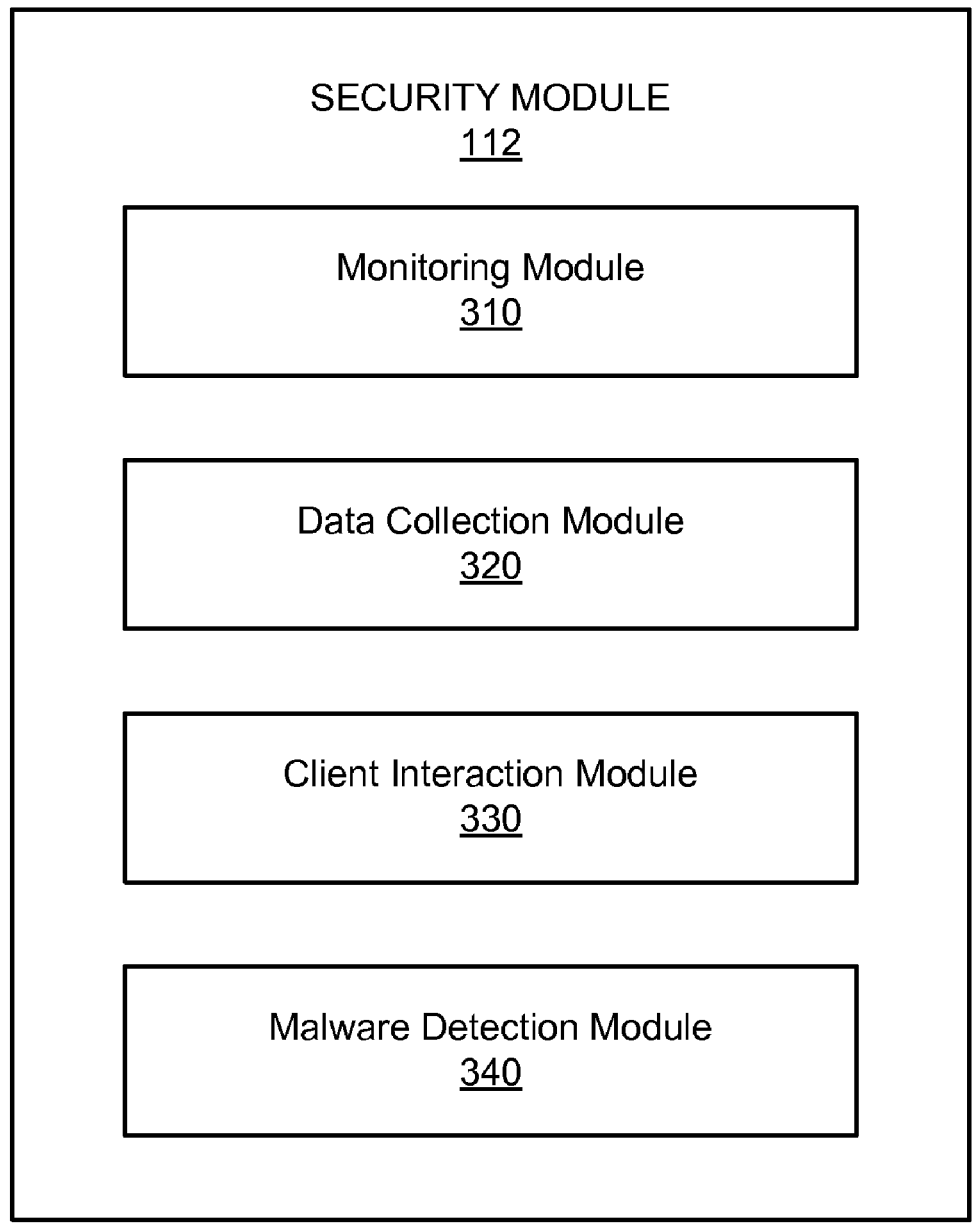
FIG. 3 is a high-level block diagram illustrating a detailed view of a security module of a client according to one embodiment.

FIG. 3 is a high-level block diagram illustrating a detailed view of a security module 112 of a client 110 according to one embodiment. In some embodiments, the security module 112 is incorporated into an operating system executing on the client 110 while in other embodiments the security module 112 is a standalone application or part of another product. As shown in FIG. 3, the security module 112 includes a monitoring module 310, a data collection module 320, a client interaction module 330, and a malware detection module 340. Those of skill in the art will recognize that other embodiments of the security module 112 can have different and/or other modules than the ones described here, and that the functionalities can be distributed among the modules in a different manner.

The monitoring module 310 monitors file activity at the client 110 and generates file heritage data based on the file activity. In one embodiment, the monitoring module 310 detects each file creation event that occurs at the client 110. For example, the monitoring module 310 can use a file system filter driver that intercepts certain file activities, such as file writes, in order to detect when a new file is being created. Depending upon the embodiment, the monitoring module 310 may also detect other types of events, such as modifications of existing files.

A data collection module 320 generates heritage data based on the monitoring performed by the monitoring module 310. The heritage data reflects a file creation event and includes the identity of the parent file and the identity of the created child file. The data collection module 320 generates identifiers of these files using, e.g., a hashing algorithm such as a variant of the Secure Hash Algorithm (SHA). In addition, the data collection module 320 collects additional information about the files, such as the names of the files, the file directories containing the files, and data describing client state at the time of the file creation event.

Depending upon the embodiment, the data collection module 320 may generate heritage data for only certain file creation events. For example, the data collection module 320 may generate heritage data for file creation events involving parent files that are categorized as executable file creators of interest or uncategorized, for file creation events where the child file is recognized as known malware, and/or in other circumstances. Similarly, the data collection module 320 may not generate heritage data for file creation events involving expected normal behaviors, such as a parent file classified as an expected executable file creator creating an executable file.

The client interaction module 330 sends reports describing the file heritage data to the security server 130. In one embodiment, a heritage data report includes the identifiers of the two files involved in the heritage relationship, and an indication of the relationships of the individual files. For example, a heritage data report can be formatted as a (identifier of parent file, identifier of child file) tuple. In one embodiment, the client interaction module 330 sends the reports to the security server 130 upon receiving the heritage data from the data collection module 320. In other embodiments, the client interaction module 330 stores the heritage data locally for a period of time and then sends reports for the accumulated heritage data in batch at specified times, such as once a day. In addition, the client interaction module 330 receives file categorization data from the security server 130.

A malware detection module 340 uses the file categorization data to detect malware at the client 110. These data categorize files into categories such as "expected executable file creators" and "executable file creators of interest." In one embodiment, the malware detection module 340 interacts with the monitoring module 310 to detect if a file categorized as an "executable file creator of interest" attempts to create an executable file. For example, the malware detection module 340 can use a behavioral policy signature that identifies the file and detects such an activity.

In one embodiment, the malware detection module 340 convicts a file as malicious if the file is categorized as an "executable file creator of interest" and the file attempts to create an executable file because this anomalous behavior is indicative of malware. In another embodiment, the file anomalously attempting to create an executable file is just one of many factors considered by the malware detection module 340 in determining whether the file is malicious. For example, the malware detection module 340 can also consider factors such as the file's reputation, the state of the client 110, characteristics of the child executable file (e.g., whether the child file contains malware), etc. The malware detection module 340 also takes appropriate actions in response to a malware conviction. For example, the malware detection module 340 can quarantine the convicted file, notify the user and/or security server 130 of the conviction, delete the created file, and/or take other actions to remediate the malware.

Figure 4:
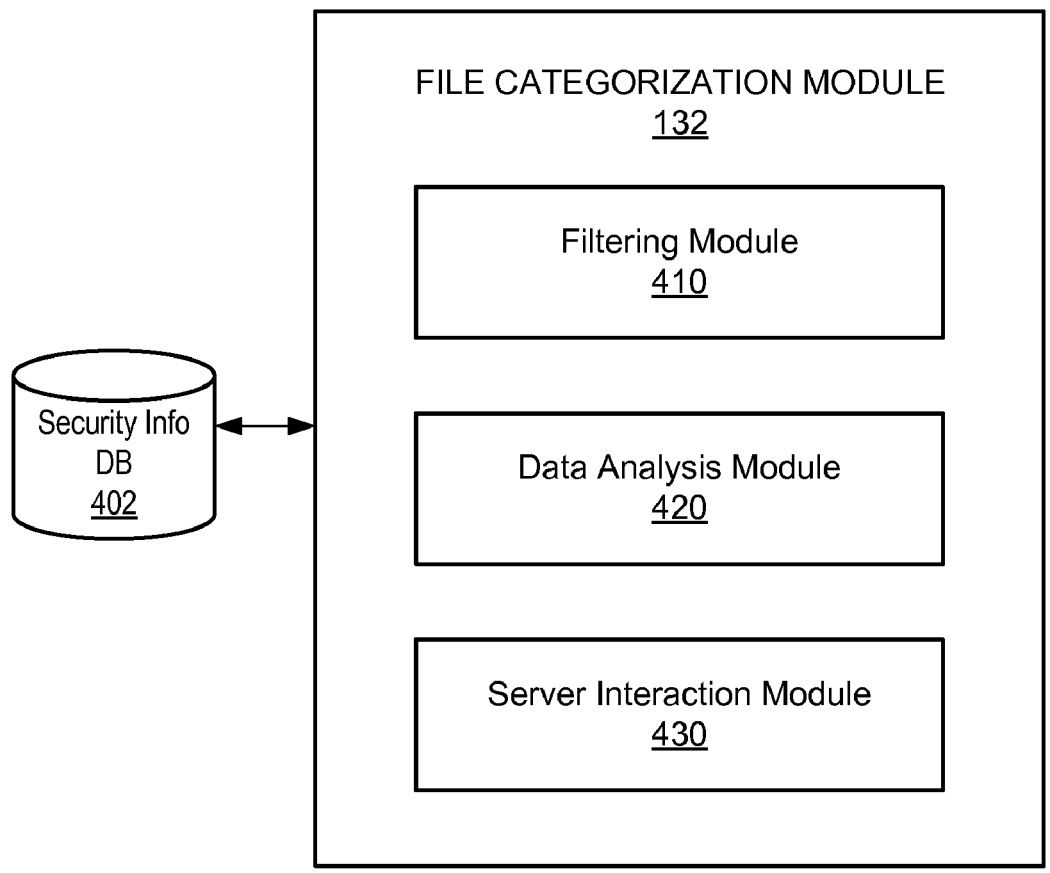
FIG. 4 is a high-level block diagram illustrating a detailed view of a file categorization module of a security server according to one embodiment.

FIG. 4 is a high-level block diagram illustrating a detailed view of the file categorization module 132 of the security server 130 according to one embodiment. The file categorization module 132 receives file heritage data reports from the clients 110 and provides file categorization data to the clients 110. As shown in FIG. 4, the file categorization module 132 includes a filtering module 410, a data analysis module 420, and a server interaction module 430. Additionally, the multiple modules of the file categorization module 132 store and/or retrieve data from a security information database 402. Those of skill in the art will recognize that other embodiments of the file categorization module 132 can have different and/or other modules than the ones described here, and that the functionalities can be distributed among the modules in a different manner.

In one embodiment, the security information database 402 stores file heritage data described by the heritage data reports received from the clients 110. As described above, the file heritage data identify a parent file and a child file created by the parent. Collectively, across all of the clients 110 that provide reports, the file heritage data describes the heritages (i.e., file creation behaviors) of a large number of files.

The security information database 402 can further store information specifying categorizations of the files. For example, the database 402 can store information indicating that a given file is "an expected executable file creator," an "executable file creator of interest," or uncategorized. The file categorizations can be derived from the heritage data and/or specified by other entities, such as by human security analysts that operate the security server 130.

In some embodiments, the security information database 402 stores additional information about files detected at the clients 110. For example, the database 402 can store reputation information for files, clients 110, and/or other entities. The reputation information can include information provided by the clients 110, by the entity that operates the security server 130, and/or by other sources. The reputation information can describe characteristics of files and include, for example, information indicating a number of clients 110 on which a file is detected, frequencies at which a file is installed and uninstalled on clients 110, information regarding any known degradations to system performance associated with a file, the dates on which file were detected on the clients 110, and the parties associated with the manufacture or development of the files. Other embodiments of the security information database 402 store different and/or additional reputation information, such as reputation scores computed from the reputation information.

Turning now to the modules within the file categorization module 132, the filtering module 410 receives heritage data from the clients 110 and filters the heritage data to identify files needing categorization. Generally, the filtering module 410 interacts with the security information database 402 to filter out heritage data identifying files that are already categorized in order to identify heritage data for uncategorized files. An uncategorized file is one that is described as a parent file of an executable file by the heritage data but has not been categorized as an "expected executable file creator" or "executable file creator of interest."

Because of the large number of different files detected at the clients, it may not be worthwhile to categorize every file that creates an executable file. Therefore, an embodiment of the filtering module 410 uses the heritage data to prioritize the uncategorized files for categorization analysis to ensure that at least the high-priority files are categorized. In one embodiment, the filtering module 410 prioritizes based on the number of clients 110 on which the files are detected. A file detected on a large number of clients 110 is typically given a high priority because categorizing such a file will enhance malware detection on many clients. In contrast, a file that is detected on only a few clients 110 is typically given a low priority. In one embodiment, the filtering module 410 flags a file for analysis if the file has been detected on greater than a threshold number of clients 110. The filtering module 410 does not flag the file for analysis if the file is detected on fewer than the threshold number of clients 110.

In one embodiment, rather than flagging certain files for analysis, the filtering module 410 sorts the uncategorized files into a priority order based on factors including the number of clients 110 on which the files were detected, frequencies at which the files create executable files, the percentages and/or numbers of child executable files created by the files, and the percentages and/or numbers of malicious executable files created by the files. Generally, the filtering module 410 will elevate the priority of files detected at many clients 110. Likewise, the filtering module 410 will elevate the priority of files that create large numbers/percentages of executable files, and/or that create large numbers/percentages of known malicious files. For example, an uncategorized file that is detected at many clients might be a new version of a popular and legitimate application that creates executable files during its normal operation. Therefore, the filtering module 410 assigns this file a high priority so that it can be quickly categorized. The filtering module 410 can filter using other and/or additional criteria in other embodiments.

The data analysis module 420 categorizes the filtered files identified by the filtering module 410 in priority order. The data analysis module 420 stores the categorizations of the files in the security information database 402. The data analysis module 420 categorizes a file as an "expected executable file creator" or an "executable file creator of interest" based on the typical behavior of the file as described by the heritage data. If the file rarely creates executable files, then one embodiment of the data analysis module 420 categorizes the file as an "executable file creator of interest" because it would be anomalous for the file to create an executable file. In contrast, if the file frequently creates executable files, then an embodiment of the data analysis module 420 categorizes the file as an "expected executable file creator."

Depending upon the embodiment, the data analysis module 420 can perform the categorization based on manual and/or automated analysis. For example, the data analysis module 420 can provide the high-priority files to a human security analyst that categorizes the files as "expected executable file creators" or "executable file creators of interest" based on the heritage data and/or implicit knowledge such as the distributor of the file, how the file is typically used at the clients 110, and/or other knowledge available to the security analyst.

Likewise, the data analysis module 420 can automatically categorize the files based on the heritage data and/or other data within the security information database 402. The data analysis module 420 can categorize a file based on the type of executable file it creates. If the file tends to create malicious files, then an embodiment of the data analysis module 420 will categorize the file as an executable file creator of interest. In contrast, if the file is widely distributed among the clients and tends to create legitimate (i.e., non-malicious) executable files, an embodiment of the data analysis module 420 will categorize the file as an expected executable file creator.

The server interaction module 430 interacts with the security modules 112 of the clients 110 to receive the heritage data reports and provide the file categorization data. In one embodiment, the file categorization data identify files using the same techniques as the heritage data reports, such as by using variants of SHA hashes. For example, the file categorization data can include a list that identifies files classified as "expected executable file creators" and a list that identifies files that are "executable file creators of interest." Similarly, the file categorization data can include behavioral policy signatures that the security modules 112 of the clients 110 can use to heuristically detect malware. For example, such a signature can specify that the security module 112 should convict a file as malicious if the file creates an executable file.

In one embodiment, the server interaction module 430 provides the file categorization data to the clients 110 in batch. For example, the server interaction module 430 can provide lists of expected executable file creators and executable file creators of interest to the clients 110 in response to client requests and/or on a periodic basis. In addition, the server interaction module 430 can provide the file categorization data for individual files to the clients 110. For example, a security module 112 of a client 110 can request the category of a specific file observed to create an executable file at the client.

Figure 5:
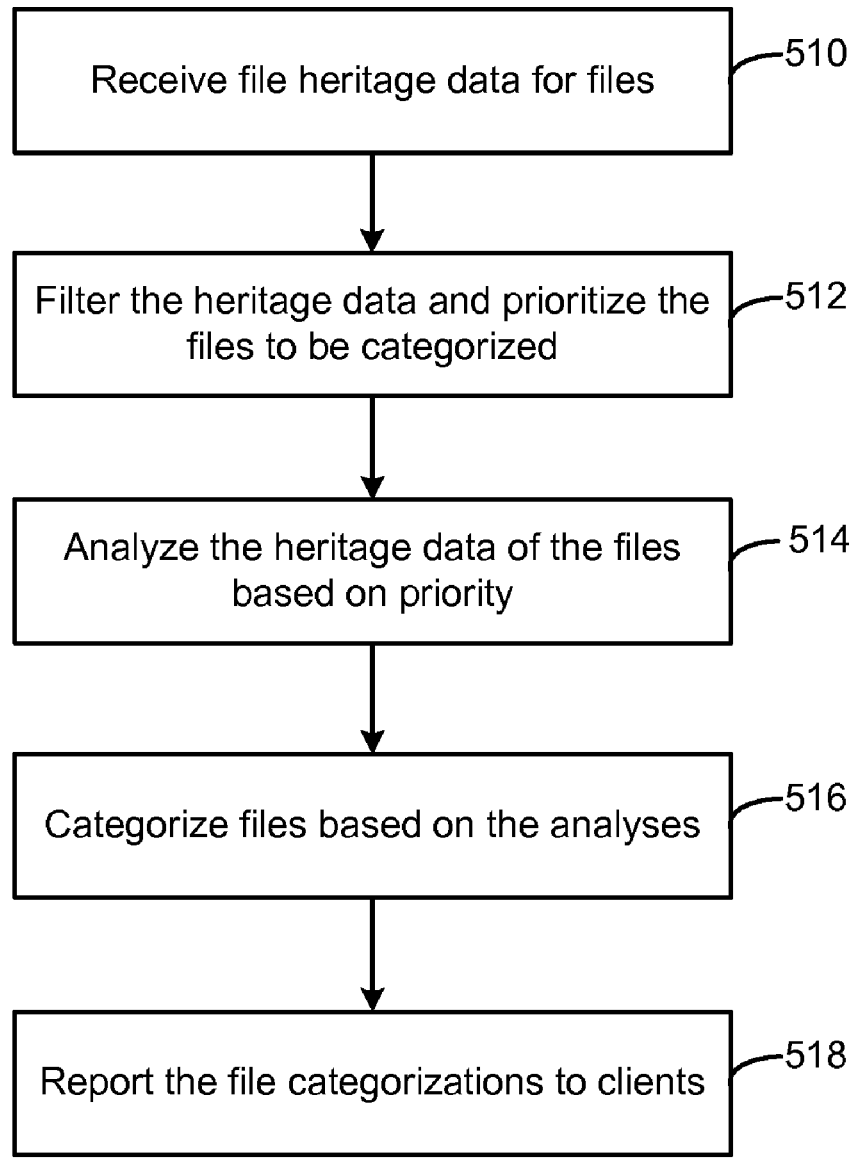
FIG. 5 is a flowchart illustrating steps performed by the file categorization module according to one embodiment.

FIG. 5 is a flowchart illustrating steps performed by the file categorization module 132 to generate and report file categorization data according to one embodiment. Other embodiments perform the illustrated steps in different orders, and/or perform different or additional steps. Moreover, some of the steps can be performed by engines or modules other than the file categorization module 132.

Initially, the file categorization module 132 receives 510 file heritage data reports from the clients 110. The heritage data reports identify parent files that created executable child files at the clients 110. The file categorization module 132 filters 512 the heritage data to identify and prioritize parent files that are not categorized. The file categorization module 132 analyzes 514 the uncategorized files in priority order to categorize 516 the files as "expected executable file creators" or "executable file creators of interest." The file categorization module 132 reports 518 the file categorization data to the security modules 112 of the clients 110. The security modules 112, in turn, use the file categorization data to identify malware at the clients 110. For example, a security module 112 can use a behavioral policy signature that detects if a particular file attempts to create an executable file, and then convict the file as malicious.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of using heritage data to detect malicious software (malware), the method comprising:

receiving heritage data reports from a plurality of clients, the heritage data reports containing heritage data describing parent files detected at the clients and child files created by the parent files at the clients;

aggregating the heritage data in the heritage data reports from the plurality of clients;
analyzing the aggregated heritage data to categorize a parent file described by the heritage data as an expected executable file creator or an executable file creator of interest based on a typical behavior of the parent file as described by the aggregated heritage data, wherein the parent file is categorized as an executable file creator of interest responsive to a determination that it is anomalous for the parent file to create an executable child file; and
reporting the categorization of the parent file to the plurality of clients;
wherein the clients are adapted to use the categorization of the parent file to detect malware at the clients.

2. The method of claim 1, further comprising:
filtering the heritage data to identify parent files described by the heritage data and not previously categorized as expected executable file creators or executable file creators of interest.

3. The method of claim 1, further comprising:
filtering the heritage data to prioritize the parent files described by the heritage data into a priority order, wherein the analyzing analyzes the parent files in the priority order.

4. The method of claim 3, wherein the filtering prioritizes the parent files based on one or more of:
a number of clients on which the parent files were detected; a frequency at which the parent files create executable files at the clients, and whether the child files created at the clients by the parent files are known malware.

5. The method of claim 1, wherein the
analysis categorizes the parent file based at least in part on whether the aggregated heritage data indicate that the parent file creates malicious executable child files at the clients.

6. The method of claim 1, wherein reporting the categorization of the parent file to the plurality of clients comprises:
providing the clients with a behavioral policy signature, wherein a client is adapted to use the behavioral policy signature to detect if the parent file attempts to create an executable child file at the client.

7. The method of claim 3, further comprising:
responsive to detecting a large number of executable files created by a parent file not previously categorized as an expected executable file creator or an executable file creator of interest, elevating priority of the parent file.

8. A non-transitory computer-readable storage medium storing executable computer program instructions for using heritage data to detect malicious software (malware), the computer program instructions comprising instructions for:
receiving heritage data reports from a plurality of clients, the heritage data reports containing heritage data describing parent files detected at the clients and child files created by the parent files at the clients;
aggregating the heritage data in the heritage data reports from the plurality of clients;
analyzing the aggregated heritage data to categorize a parent file described by the heritage data as an expected executable file creator or an executable file creator of interest based on a typical behavior of the parent file as described by the aggregated heritage data, wherein the parent file is categorized as an executable file creator of interest responsive to a determination that it is anomalous for the parent file to create an executable child file; and
reporting the categorization of the parent file to the plurality of clients;
wherein the clients are adapted to use the categorization of the parent file to detect malware at the clients.

9. The computer-readable storage medium of claim 8, further comprising computer program instructions for:
filtering the heritage data to identify parent files described by the heritage data and not previously categorized as expected executable file creators or executable file creators of interest.

10. The computer-readable storage medium of claim 8, further comprising computer program instructions for:
filtering the heritage data to prioritize the parent files described by the heritage data into a priority order, wherein the analyzing analyzes the parent files in the priority order.

11. The computer-readable storage medium of claim 10, wherein the computer program instructions for filtering comprise instructions for prioritizing the parent files based on one or more of:
a number of clients on which the parent files were detected; a frequency at which the parent files create executable files at the clients, and whether the child files created at the clients by the parent files are known malware.

12. The computer-readable storage medium of claim 8, wherein the
analysis categorizes the parent file based at least in part on whether the aggregated heritage data indicate that the parent file creates malicious executable child files at the clients.

13. The computer-readable storage medium of claim 8, wherein the computer program instructions for reporting the categorization of the parent file to the plurality of clients comprise instructions for:
providing the clients with a behavioral policy signature, wherein a client is adapted to use the behavioral policy signature to detect if the parent file attempts to create an executable child file at the client.

14. A system of using heritage data to detect malicious software (malware) comprising:
a non-transitory computer-readable storage medium storing executable computer program modules comprising:
a server interaction module for receiving heritage data reports from a plurality of clients, the heritage data reports containing heritage data describing parent files detected at the clients and child files created by the parent files at the clients;
a data analysis module for aggregating the heritage data in the heritage data reports from the plurality of clients and analyzing the aggregated heritage data to categorize a parent file described by the heritage data as an expected executable file creator or an executable file creator of interest based on a typical behavior of the parent file as described by the aggregated heritage data, wherein the parent file is categorized as an executable file creator of interest responsive to a determination that it is anomalous for the parent file to create an executable child file;
the server interaction module for reporting the categorization of the parent file to the plurality of clients;
wherein the clients are adapted to use the categorization of the parent file to detect malware at the clients; and
a processor for executing the computer program modules.

15. The system of claim 14, wherein the computer-readable storage medium further comprises a filtering module for:

filtering the heritage data to identify parent files described by the data and not previously categorized as expected executable file creators or executable file creators of interest.

16. The system of claim 15, wherein the filtering module is further for:

filtering the heritage data to prioritize the parent files described by the heritage data into a priority order, wherein the analyzing analyzes the parent files in the priority order.

17. The system of claim 16, wherein the filtering prioritizes the parent files based on one or more of:

a number of clients on which the parent files were detected;
a frequency at which the parent files create executable files at the clients, and whether the child files created at the clients by the parent files are known malware.

18. The system of claim 14, wherein the data analysis module categorizes the parent file based at least in part on whether the aggregated heritage data indicate that the parent file creates malicious executable child files at the clients.

19. The system of claim 14, wherein reporting the categorization of the parent file to the plurality of clients comprises:

providing the clients with a behavioral policy signature, wherein a client is adapted to use the behavioral policy signature to detect if the parent file attempts to create an executable child file at the client.

* * * * *